United States Patent Office 2,897,205
Patented July 28, 1959

2,897,205

1-ETHERIFIED OXYALKYL IMIDAZOLE-4,5-DICARBOXAMIDES, INTERMEDIATES AND PROCESS

William J. Leanza, Staten Island, N.Y., assignor to Merck & Co., Inc., Rahway, N.J., a corporation of New Jersey No Drawing. Application June 27, 1958
Serial No. 744,910

20 Claims. (Cl. 260—309)

This invention relates generally to new imidazole compounds. More particularly, it relates to certain 1-substituted-4,5-imidazoledicarboxamides. Still more specifically, it is concerned with 1-hydrocarbonoxyalkyl 4,5-imidazoledicarboxamides, and with intermediates in the chemical synthesis of such compounds. It relates also to methods of preparing these new substances.

4,5-imidazoledicarboxamide is a known compound having the chemical structure

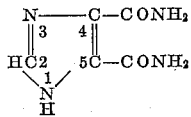

This substance and certain related substances are known to have a significant degree of anticoccidial activity. It is the purpose of this invention to provide a new type of 1-substituted imidazoles that are highly active against coccidiosis and that also possess the advantage of being soluble in water to a degree that makes them suitable for treating coccidiosis via the drinking water of poultry.

It has now been discovered that 1-hydrocarbonoxyalkyl 4,5-imidazoledicarboxamides having the general structural Formula I:

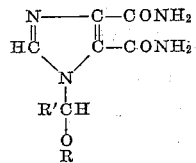

where R' is hydrogen or lower alkyl and R is a hydrocarbon radical having less than nine carbon atoms, are very active against poultry coccidiosis.

It is an object of this invention, therefore, to provide the hitherto unknown imidazoles of Formula I. It is also an object of the invention to provide 1-substituted 4,5-imidazoledicarboxamides where the R group in Formula I above is alkyl and is further substituted by a lower alkoxy radical, i.e. where R is alkoxyalkyl. A still further object is the provision of animal feedstuffs and animal feed supplements containing such new compounds. An additional object is a chemical synthesis of 1-hydrocarbonoxyalkyl 4,5-imidazoledicarboxamides from metal salts of lower alkyl 4,5-imidazoledicarboxylates. A still further object is provision of 1-hydrocarbonoxyalkyl lower alkyl 4,5-imidazoledicarboxylates, which substances are intermediates in such chemical synthesis. Other objects will become apparent from the following detailed discussion of the invention.

According to this invention, 1-hydrocarbonoxyalkyl 4,5-imidazoledicarboxamides are prepared by a process which may be structurally illustrated as follows:

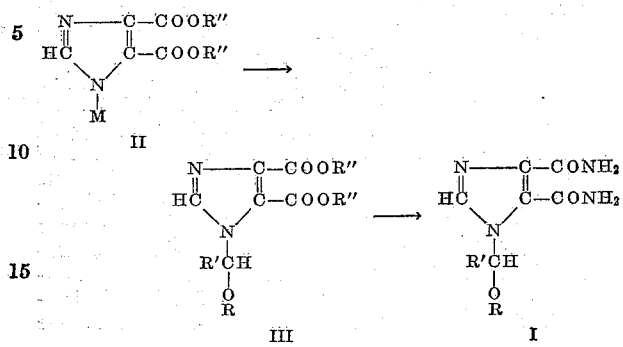

In these formulas, M is a metal of group I of the periodic table of elements, R is a hydrocarbon radical having less than nine carbon atoms, R' is hydrogen or a lower alkyl group, and R" is a lower alkyl group. R is preferably a lower alkyl radical such as methyl, ethyl or propyl, R may also be an aralkyl radical such as benzyl or phenylethyl or it may be an aryl group such as phenyl or dichlorophenyl. As will be discussed more fully below, R may also be alkoxyalkyl. In the preferred embodiments of my invention, R' is hydrogen, but it may also be lower alkyl such as methyl or ethyl. It will be appreciated that the nature of R and R' is determined by the ether employed as a reactant in the first step of the process.

In this initial step, a suitable metal salt of a lower alkyl 4,5-imidazoledicarboxylate is reacted with a halo ether of the structure ROCHR'X, X being chlorine or bromine. R and R' are as above defined. The products of this reaction are a metal halide and a 1-hydrocarbonoxyalkyl lower alkyl 4,5-imidazoledicarboxylate of Formula III.

As the imidazole metal salt reactant I employ a salt where the metal is in group I of the periodic table of elements. I prefer to employ an alkali metal salt, e.g. a sodium, potassium or lithium salt, or a heavy metal salt such as the silver compound. The silver salt is a particularly useful derivative since a highly insoluble silver halide is thereby produced. This facilitates separation of the inorganic material and also favors the formation of the desired Compound III from a chemical equilibrium standpoint.

The particular imidazole diester used is not critical and any lower alkyl diester is satisfactory. It is preferred, however, to employ the dimethyl, diethyl or dibutyl esters of 1-metallo-4,5-imidazoledicarboxylate. Suitable starting materials that might be mentioned as representative are silver dimethyl 4,5-imidazoledicarboxylate; silver diethyl 4,5-imidazoledicarboxylate; sodium dimethyl 4,5-imidazoledicarboxylate; potassium diethyl 4,5-imidazoledicarboxylate; lithium dibutyl 4,5-imidazoledicarboxylate and silver dibutyl 4,5-imidazoledicarboxylate.

The other reactant in the first step of the synthesis is a mono halo ether. This may be a symmetrical ether such as chloro methyl or bromo methyl ether, or it may be a mono halo derivative of a mixed ether such as ethyl chloromethyl ether, isopropyl chloromethyl ether, isobutyl chloromethyl ether, benzyl chloromethyl ether and 2,4-dichlorophenyl chloromethyl ether. As will be realized by those skilled in this art, a 1-substituted imidazole wherein R' in Formulas I and III is hydrogen will be obtained when a halo methyl ether is employed. Compounds where R' is lower alkyl are produced by reacting the metal salt of lower alkyl 4,5-imidazoledicarboxylate with a mono-halo ether having the halogen attached to the α-carbon atom of the ether: for example methyl α-chloroethyl ether, ethyl α-chloroethyl ether, n-propyl α-chloroethyl ether and n-amyl α-chloroethyl ether.

The condensation of the metal salt II with a halo ether of the type described above is brought about in an inert organic solvent medium. By an inert solvent is meant one that will not react with either the imidazole compound or the halo ether. Thus, hydroxylic solvents are normally not employed. Reaction solvents which may be used satisfactorily are those such as benzene, toluene, xylene, petroleum ether, hexane, diethyl ether tetrahydrofuran and the dimethyl ether of ethylene glycol (diglyme) and the like. The time and temperature of the reaction are not critical. However, the reaction rate is accelerated at elevated temperatures, so that it is desirable to run the reaction at temperatures in the range of 60–140° C., and preferably at about 80–120° C. Under optimum conditions, the formation of the desired 1-hydrocarbonoxyalkyl lower alkyl 4,5-imidazoledicarboxylates is substantially complete in one-half to five hours.

The product of Formula III is readily recovered by removal of the inorganic metal halide and concentration of the reaction mixture to remove the solvent. The 1-substituted imidazole diester thus obtained may be purified, if desired, by crystallization from organic solvents. However, in the production of the 1-substituted 4,5-imidazoledicarboxamides of this invention, it is preferred to treat the diester directly without further purification.

Compounds that may be mentioned as representative of 1-hydrocarbonoxyalkyl lower alkyl 4,5-imidazoledicarboxylates which fall within the purview of this invention, and which are produced by the process hereinabove described are 1-methoxymethyl dimethyl 4,5-imidazoledicarboxylate; 1-ethoxymethyl dimethyl 4,5-imidazoledicarboxylate; 1-methoxymethyl diethyl 4,5-imidazoledicarboxylate; 1-ethoxymethyl diethyl 4,5-imidazoledicarboxylate; 1-isopropoxymethyl dibutyl 4,5-imidazoledicarboxylate; 1-isobutoxymethyl dimethyl 4,5-imidazoledicarboxylate; 1-(α-ethoxyethyl) diethyl 4,5-imidazoledicarboxylate; 1(α-methoxyethyl) dimethyl 4,5-imidazoledicarboxylate; 1-(α-propoxyethyl) dipropyl 4,5-imidazoledicarboxylate; 1-(α-ethoxyethyl) dimethyl 4,5-imidazoledicarboxylate; 1-benzyloxymethyl dimethyl 4,5-imidazoledicarboxylate and 1-methoxymethyl dibutyl 4,5-imidazoledicarboxylate.

Substances of the type referred to above are converted to the corresponding 1-hydrocarbonoxyalkyl 4,5-imidazoledicarboxamides of Formula I by treatment with ammonia. I prefer to bring about the amidation with aqueous concentrated ammonium hydroxide and to use an excess of ammonia. The reaction is conveniently carried out at about room temperature and is substantially complete in two to ten hours, although longer reaction times have no adverse effect on the yield of quality of the desired products and may be employed if desired. The diamides thus produced are normally insoluble in the aqueous ammoniacal reaction medium and are readily recovered by techniques such as filtration or centrifugation. They may be purified by recrystallization from lower alkanoic solvents such as methanol, ethanol or isopropanol.

Typical of the 1-substituted 4,5-imidazoledicarboxamides which may be prepared in this fashion from the corresponding diesters are 1-methoxymethyl 4,5-imidazoledicarboxamide; 1-ethoxymethyl 4,5-imidazoledicarboxamide; 1-isopropoxymethyl 4,5-imidazoledicarboxamide; 1-isobutoxymethyl 4,5-imidazoledicarboxamide; 1-(α-ethoxyethyl) 4,5-imidazoledicarboxamide; 1-(α-methoxyethyl) 4,5-imidazoledicarboxamide; 1-(α-propoxyethyl) 4,5-imidazoledicarboxamide and 1-benzyloxymethyl 4,5-imidazoledicarboxamide.

In addition to the imidazoles discussed hereinabove, a second embodiment of the invention comprises 1-hydrocarbonoxyalkyl 4,5-imidazoledicarboxamides and dicarboxylates wherein the hydrocarbon residue contains a lower alkoxy substituent. These may be represented by the formulae

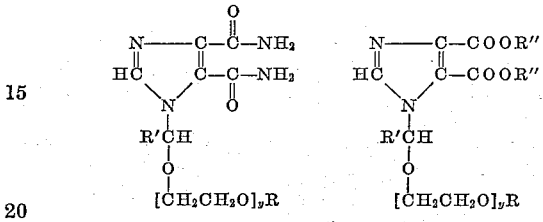

wherein R is a lower alkyl radical, y is 1 or 2 and R' is hydrogen or a lower alkyl radical, and R" is a lower alkyl radical.

These new substances are prepared by the same method described above for the other compounds of the invention by using the appropriate halo ether in the first step of the synthesis. Typical compounds of this type are 1-(2-methoxyethyl) methyl lower alkyl 4,5-imidazoledicarboxylate; 1-(2-methoxyethoxy) methyl 4,5-imidazoledicarboxamide and the like.

Thus, the products of this invention may be described as 4,5-imidazoledicarboxamides and 4,5-imidazoledicarboxylates having at the 1-position a substituent of the formula

where R' is hydrogen or lower alkyl, and R is a hydrocarbon radical having less than nine carbon atoms.

The 1-substituted 4,5-imidazoledicarboxamides of this invention are highly active against poultry coccidiosis. When fed at very low levels to poultry as a component of the poultry feed or drinking water they prevent the development of coccidiosis in the birds. Good control of the disease is obtained when the 1-substituted imidazoledicarboxyamides are administered to chickens in an amount equal to about 0.0015% to about 0.02% by weight of the daily feed consumption. The optimum dose level will, of course, vary somewhat with the substituent present at the 1-position of the imidazole ring. With 1-methoxymethyl 4,5-imidazoledicarboxamide and 1-ethoxymethyl 4,5-imidazoledicarboxamide excellent results in the prevention of coccidiosis are obtained when the compounds are administered at levels of about 0.002% to 0.006% by weight of the poultry ration.

When using the compounds of the invention for the prevention or control of coccidiosis, the active coccidiostat is normally first compounded into an animal feed supplement. These supplements, which contain relatively large percentages of the coccidiostat, are then uniformly distributed in the finished animal feed either directly or after an intermediate processing step. The feed supplements are prepared by adding the 1-substituted 4,5-imidazoledicarboxamide to a suitable carrier and mixing for sufficient time to give substantially uniform dispersion of the coccidiostat in the carrier. These supplements ordinarily contain about 1% to 40% by weight, and preferably from about 2–25% by weight of active ingredient. The carrier or diluent is a solid edible material that is inert with respect to the 1-substituted imidazoledicarboxamide and that may be administered with safety to the animals to be treated. Typical of such carriers are distillers' grains, corn meal, ground oyster shells, attapulgus clay, molasses solubles, antibiotic mycelia, soya grits, crushed limestone and the like. Typical feed supplements would comprise, for instance, 20% 1-methoxymethyl 4,5-imidazoledicarboxamide and 80% distillers dried grains; 10% 1-ethoxymethyl 4,5-imidazoledicarboxamide and 90% ground oyster shell; 15% 1-(2-methoxyethoxy) methyl 4,5-imidazoledicarboxamide and 85% molasses solubles.

Certain of the new substances encompassed by our invention are relatively soluble in water. Such compounds are advantageously used for preventing or controlling poultry coccidiosis by dissolving them in the drinking water of the birds. Alternatively, suspensions of the active ingredients in the drinking water also represent a suitable mode of administering these new compounds. Furthermore, it will be appreciated that the compounds of this invention may be used concurrently with other coccidiostats known heretofore such as sulfaquinoxaline and nicarbazin.

The following examples are given for purposes of illustration and not by way of limitation:

Example 1

(a) Six grams of silver dimethyl 4,5-imidazoledicarboxylate in 100 ml. of toluene is mixed with 3 ml. of chloromethylether, and the resulting mixture is refluxed for about 18 hours. At the end of this time the precipitated silver chloride is removed by filtration and the filtrate concentrated in vacuo to dryness. 1-methoxymethyl dimethyl 4,5-imidazoledicarboxylate is obtained as a syrupy residue.

(b) The residue of 1-methoxymethyl dimethyl 4,5-imidazoledicarboxylate obtained above is dissolved in 50 ml. of aqueous concentrated ammonium hydroxide and 20 ml. of methanol. This mixture is allowed to stand at room temperature for 24 hours. At the end of this time the precipitated 1-methoxymethyl 4,5-imidazoledicarboxamide is recovered by filtration and recrystallized from methanol. The substantially pure material thus obtained has a melting point of 186–188° C. It has a solubility in water of about 0.6%.

Analysis.—Calcd. for: $C_7H_{10}N_4O_3$: C, 42.42; H, 5.09; N, 28.27. Found: C, 42.47; H, 4.96; N, 28.62.

1-silver dimethyl 4,5-imidazoledicarboxylate, a known compound, is prepared by adding a solution of 17 grams of silver nitrate in 150 ml. of water to a solution of 18.6 grams of dimethyl 4,5-imidazoledicarboxylate in 700 ml. of 50% aqueous methanol at 50° C. Dilute ammonium hydroxide is slowly added until the reaction mixture is slightly basic. The resulting gel is digested at 50–60° C. for about 90 minutes, during which time it becomes granular. The granular silver salt is recovered by filtration, washed with water and methanol, and dried in vacuo.

The silver salts of other lower alkyl 4,5-imidazoledicarboxylates such as the ethyl, propyl and butyl esters, are prepared in the same manner.

Example 2

4.5 ml. of ethyl chloromethyl ether is added to a suspension of nine grams of silver dimethyl 4,5-imidazoledicarboxylate in 120 ml. of toluene and the resulting mixture refluxed for about 17 hours. The silver chloride which precipitates is filtered off and the clear filtrate concentrated to a syrup in vacuo. This syrup is essentially pure 1-ethoxymethyl dimethyl 4,5-imidazoledicarboxylate.

The 1-ethoxymethyl dimethyl 4,5-imidazoledicarboxylate is dissolved in 60 ml. of concentrated ammonia water and the mixture allowed to stand at room temperature for about 18 hours. The 1-ethoxymethyl 4,5-imidazoledicarboxamide which precipitates during this reaction period, is collected by filtration, melting point 145–165° C. This material is recrystallized from methanol to give substantially pure 1-ethoxymethyl 4,5-imidazoledicarboxamide, melting point 165–167° C., solubility in water about 0.3%.

Analysis.—Calcd. for: $C_8H_{10}N_4O_3$: C, 45.71; H, 4.80; N, 26.66. Found: C, 45.31; H, 5.03; N, 25.81.

The ethyl chloromethyl ether utilized in this experiment is prepared according to the procedure described in J. Am. Chem. Soc., 47, 2419 (1925).

Example 3

Twelve grams of 1-chloromethoxy-2-methoxyethane is mixed with 29 grams of silver dimethyl 4,5-imidazoledicarboxylate in 150 ml. of dry toluene. The addition of the ether to the imidazole compound is carried out at the reflux temperature of toluene. The resulting mixture is refluxed overnight and the precipitated silver chloride then removed by filtration. The filtrate is evaporated to dryness to give a residue of 1-(2-methoxyethoxy) methyl dimethyl 4,5-imidazoledicarboxylate.

The 1-substituted imidazole compound obtained as described in the preceding paragraph is dissolved in 150 ml. of concentrated aqueous ammonium hydroxide solution and the resulting mixture allowed to stand at room temperature for about five hours. The resulting precipitate is collected by filtration, washed with water and dried, melting point 139–140° C. The solid 1-(2-methoxyethoxy) methyl 4,5-imidazoledicarboxamide thus obtained is purified by dissolving in 120 ml. of hot water, filtering said aqueous solution, removing the aqueous solvent by concentration in vacuo and recrystallization of the residue thus obtained from methanol to give substantially pure 1-(2-methoxyethoxy) methyl 4,5-imidazoledicarboxamide. It has a solubility in water of about 2.5%.

Analysis.—Calcd. for: $C_9H_{14}N_4O_4$: C, 44.62; H, 5.83; N, 23.13. Found: C, 44.34; H, 5.30; N, 24.26.

The 1-chloromethoxy-2-methoxyethane utilized as one of the starting materials in this experiment is prepared as follows: dry hydrogen chloride gas is passed into a cold mixture of 38 grams of ethylene glycol monomethyl ether and 15 grams of paraformaldehyde. After 30 minutes 50 ml. of petroleum ether and 25 grams of calcium chloride are added to the reaction mixture, and addition of hydrogen chloride continued for 90 additional minutes. At the end of this time the petroleum ether layer is separated and dried over calcium chloride.

The petroleum ether solution is concentrated under nitrogen to remove the solvent. The residue is distilled at atmospheric pressure from a small amount of sodium carbonate to give 1-chloromethoxy-2-methoxyethane, boiling point 150° C.

Analysis.—Calcd. for $C_4H_9ClO_2$: C, 38.56; H, 7.28; Cl, 28.46. Found: C, 38.95; H, 7.88; Cl, 27.22.

Example 4

21 grams of diethyl imidazoledicarboxylate is added to a solution of sodium ethoxide prepared by dissolving 3.0 grams of sodium metal in 50 ml. of ethanol. The alcohol is then removed in vacuo leaving a residue of 1-sodio diethyl 4,5-imidazoledicarboxylate.

To this sodium salt there is added 16 grams of benzyl chloromethyl ether in 100 ml. of benzene. The mixture is stirred under reflux for about 18 hours. The precipitated sodium chloride is then removed by filtration and the filtrate concentrated in vacuo to give a syrupy 4,5-imidazoledicarboxylate.

The 1-benzyloxymethyl diethyl 4,5-imidazoledicarboxylate is dissolved in 100 ml. of concentrated ammonium hydroxide and 30 ml. of ethanol, and the mixture held at room temperature for about six hours. The precipitated 1-benzyloxymethyl 4,5-imidazoledicarboxamide is recovered by filtration and purified by recrystallization from methanol.

Any departure from the above description is intended to be included within the scope of the claims.

What is claimed is:
1. A compound having the formula

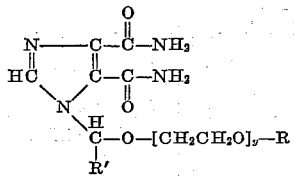

wherein R is a hydrocarbon radical having less than nine carbon atoms, R' is selected from the class consisting of hydrogen and lower alkyl, and y has a value of 0 to 2.

2. A compound having the formula

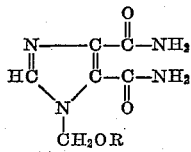

wherein R is a lower alkyl group.

3. 1-methoxymethyl-4,5-imidazoledicarboxamide.
4. 1-ethoxymethyl-4,5-imidazoledicarboxamide.
5. 1-(2-methoxyethoxy) methyl 4,5-imidazoledicarboxamide.
6. 1-benzyloxymethyl-4,5-imidazoledicarboxamide.
7. A compound of the formula

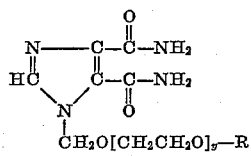

where R is a hydrocarbon group having less than nine carbon atoms, and y has a value of 0 to 2.

8. The process which comprises reacting a 1-metallo di-lower alkyl 4,5-imidazoledicarboxylate of the formula

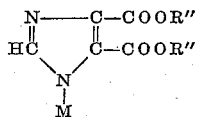

with a halo ether of the formula XR'HCOR thereby forming a substituted imidazole of the formula

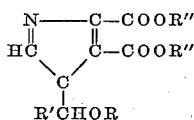

and treating said latter substance with ammonia thereby producing a 1-substituted-4,5-imidazoledicarboxamide of the formula

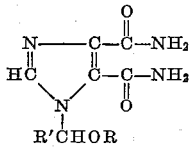

wherein M is a metal of group I of the periodic table of elements, X is selected from the class consisting of chlorine and bromine, R is lower alkyl, R' is selected from the group consisting of hydrogen and lower alkyl and R'' is lower alkyl.

9. The process which comprises reacting a 1-metallo di-lower alkyl 4,5-imidazoledicarboxylate of the formula

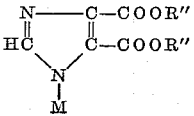

with a halo ether of the formula $$XH_2CO-[CH_2CH_2O]_y-R$$

thereby forming a substituted imidazole of the formula

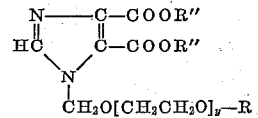

and treating said latter substance with ammonia thereby producing a 1-substituted-4,5-imidazoledicarboxamide of the formula

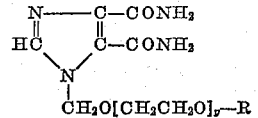

wherein M is a metal of group I of the periodic table of elements, X is selected from the class consisting of chlorine and bromine, R is a hydrocarbon group having less than nine carbon atoms and y has a value of 0 to 2.

10. The process for preparing a 1-substituted-4,5-imidazoledicarboxamide of the formula

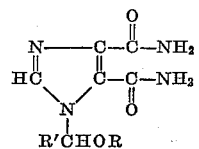

that comprises treating a substance of the formula

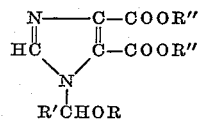

with ammonia, wherein R and R'' are lower alkyl groups and R' is selected from the class consisting of hydrogen and lower alkyl groups.

11. The process for preparing 1-methoxymethyl-4,5-imidazoledicarboxamide that comprises treating silver dimethyl 4,5-imidazoledicarboxylate with chloromethyl ether to produce 1-methoxymethyl dimethyl 4,5-imidazoledicarboxylate and contacting said latter substance with concentrated ammonia.

12. The process for preparing 1-ethoxymethyl-4,5-imidazoledicarboxamide that comprises treating silver dimethyl 4,5-imidazoledicarboxylate with ethyl chloromethyl ether to produce 1-ethoxymethyl dimethyl 4,5-imidazoledicarboxylate and contacting said latter substance with concentrated ammonia.

13. The process for preparing 1-(2-methoxyethoxy) methyl 4,5-imidazoledicarboxamide that comprises treating silver dimethyl 4,5-imidazoledicarboxylate with 1-chloromethoxy-2-methoxy ethane to produce 1-(2-methoxyethoxy) methyl dimethyl 4,5-imidazoledicarboxylate and contacting said latter substance with concentrated ammonia.

14. A compound having the formula

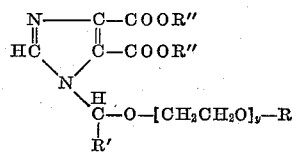

wherein R is a hydrocarbon radical having less than nine carbon atoms, R'' is lower alkyl, R' is selected from the class consisting of hydrogen and lower alkyl, and y has a value of 0 to 2.

15. A compound of the formula

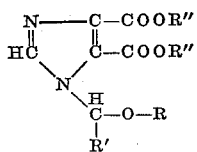

wherein R, R' and R" are lower alkyl radicals.

16. A compound of the formula

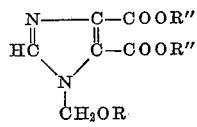

wherein R and R" are lower alkyl groups.

17. 1-methoxymethyl dimethyl 4,5-imidazoledicarboxylate.

18. 1-ethoxymethyl dimethyl 4,5-imidazoledicarboxylate.

19. 1-(2-methoxyethoxy) methyl dimethyl 4,5-imidazoledicarboxylate.

20. The process for preparing a substituted imidazole of the structure.

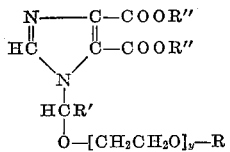

that comprises reacting a compound of the formula

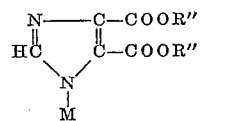

with a halogenated ether of the formula

where M is a metal of group I of the periodic table of elements, R is a hydrocarbon radical having less than nine carbon atoms, R' is selected from the group consisting of hydrogen and lower alkyl, R" is a lower alkyl group and $y$ is 0 to 2.

No references cited.